(12) United States Patent
Chang

(10) Patent No.: US 8,791,615 B2
(45) Date of Patent: Jul. 29, 2014

(54) ELECTRIC GENERATING DEVICE HAVING A GEARBOX HAVING FLYWHEELS

(76) Inventor: Chin Te Chang, Taipei (TW)

( * ) Notice: Subject to any disclaimer, the term of this patent is extended or adjusted under 35 U.S.C. 154(b) by 724 days.

(21) Appl. No.: 12/932,897

(22) Filed: Mar. 9, 2011

(65) Prior Publication Data

US 2012/0228975 A1    Sep. 13, 2012

(51) Int. Cl.
*H02K 21/22*    (2006.01)
*H02K 7/02*    (2006.01)

(52) U.S. Cl.
USPC ............... 310/114; 310/75 R; 310/83; 310/99

(58) Field of Classification Search
CPC ....... H02K 47/20; H02K 47/22; H02K 47/26; F02N 11/04
USPC ...................... 310/83, 99, 112–114
See application file for complete search history.

(56) References Cited

U.S. PATENT DOCUMENTS

| 4,354,448 | A | * | 10/1982 | Lin ............................... 116/161 |
| 6,690,141 | B1 | | 2/2004 | Yu |
| 7,108,095 | B1 | * | 9/2006 | Washington et al. .......... 180/165 |
| 7,723,880 | B2 | * | 5/2010 | Dai ............................. 310/75 R |
| 2002/0189398 | A1 | * | 12/2002 | Mu et al. .................... 74/665 GE |
| 2004/0250788 | A1 | * | 12/2004 | Carden ...................... 123/192.2 |
| 2005/0162026 | A1 | * | 7/2005 | McCain et al. ................. 310/88 |
| 2005/0200221 | A1 | * | 9/2005 | Vasilovich et al. ...... 310/156.37 |
| 2010/0171381 | A1 | * | 7/2010 | Ling ............................. 310/113 |

* cited by examiner

*Primary Examiner* — Terrance Kenerly
(74) *Attorney, Agent, or Firm* — Charles E. Baxley

(57) ABSTRACT

An electric generating device includes a motor having a spindle and a bevel gear, an electric generating mechanism having a pivot axle and another bevel gear, and a speed increasing device includes a flywheel and a bevel gear attached to a secondary shaft and engaged with the bevel gear of the motor spindle, another flywheel and two further bevel gears attached to a primary shaft and engaged with the bevel gears of the secondary shaft and the electric generating mechanism for increasing a momentum of the shafts and for increasing the driving speed of the electric generating mechanism and for decreasing the noise of the electric generating mechanism.

7 Claims, 5 Drawing Sheets

ELECTRIC GENERATING DEVICE HAVING A GEARBOX HAVING FLYWHEELS

BACKGROUND OF THE INVENTION

1. Field of the Invention

The present invention relates to an electric generating device, and more particularly to an electric generating device including a speed increasing device for suitably increasing the driving speed of the electric generating device and for suitably increasing the electricity generating effect or efficiency thereof, and including a mechanism for suitably decreasing the noise that may be generated by the electric generating device.

2. Description of the Prior Art

Typical electric generating devices comprise an electric generator or generating mechanism for generating the electricity or the electric energy or power, and normally, an electric motor or a manual driving or actuating mechanism is further provided and coupled to the electric generator or generating mechanism for actuating or operating the electric generator or generating mechanism to generate the electricity or the electric energy or power. For example, U.S. Pat. No. 4,354,448 to Lin, and U.S. Pat. No. 6,690,141 to Yu disclose two of the typical electric generating devices each comprising a transmission gearing mechanism connected or coupled between an electric generator or generating mechanism and a motor or a manual driving or actuating mechanism for increasing the driving speed of the electric generator or generating mechanism.

However, normally, the transmission gearing mechanism may not be used or provided for suitably increasing the driving speed of the electric generator or generating mechanism, or the increasing of the driving speed of the electric generator or generating mechanism is limited, and normally, no flywheel devices have been provided and attached or connected or coupled to the transmission gearing mechanism for suitably increasing the driving speed of the electric generator or generating mechanism.

The present invention has arisen to mitigate and/or obviate the afore-described disadvantages of the conventional electric generating devices.

SUMMARY OF THE INVENTION

The primary objective of the present invention is to provide an electric generating device including a speed increasing device for suitably increasing the driving speed of the electric generating device and for suitably increasing the electricity generating effect or efficiency thereof.

The other objective of the present invention is to provide an electric generating device including a mechanism for suitably decreasing the noise that may be generated by the electric generating device.

In accordance with one aspect of the invention, there is provided an electric generating device comprising a power driving device including a motor having a spindle, and a first bevel gear attached to the spindle and rotated in concert with the spindle, an electric generating mechanism including a pivot axle, and a second bevel gear attached to the pivot axle and rotated in concert with the pivot axle, and a speed increasing device including a first shaft and a second shaft, a first flywheel attached to the first shaft and rotated in concert with the first shaft for increasing a momentum of the first shaft, a second flywheel attached to the second shaft and rotated in concert with the second shaft for increasing a momentum of the second shaft, a third bevel gear attached to the second shaft and rotated in concert with the second shaft and engaged with the first bevel gear of the motor, a fourth bevel gear attached to the second shaft and rotated in concert with the second shaft, a fifth bevel gear attached to the first shaft and rotated in concert with the first shaft and engaged with the fourth bevel gear of the second shaft, and a sixth bevel gear attached to the first shaft and rotated in concert with the first shaft and engaged with the second bevel gear of the electric generating mechanism.

The first shaft includes a seventh bevel gear attached or secured or mounted to the first shaft and rotated in concert with the first shaft, and the speed increasing device includes a pivot rod, and an eighth bevel gear attached to the pivot rod and rotated in concert with the pivot rod and engaged with the seventh bevel gear of the first shaft.

A second power driving device may further be provided and includes a second motor having a spindle, and a ninth bevel gear attached or mounted to the spindle and rotated in concert with the spindle and engaged with the seventh bevel gear of the first shaft. The second motor is coupled to a driver and an electric power source.

A voltage detector may further be provided and connected between the electric generating mechanism and the second power driving device. The first shaft includes a third flywheel attached to the pivot rod and rotated in concert with the pivot rod.

The electric generating mechanism is coupled to a transformer and a load. The motor may also be coupled to a driver and an electric power source.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
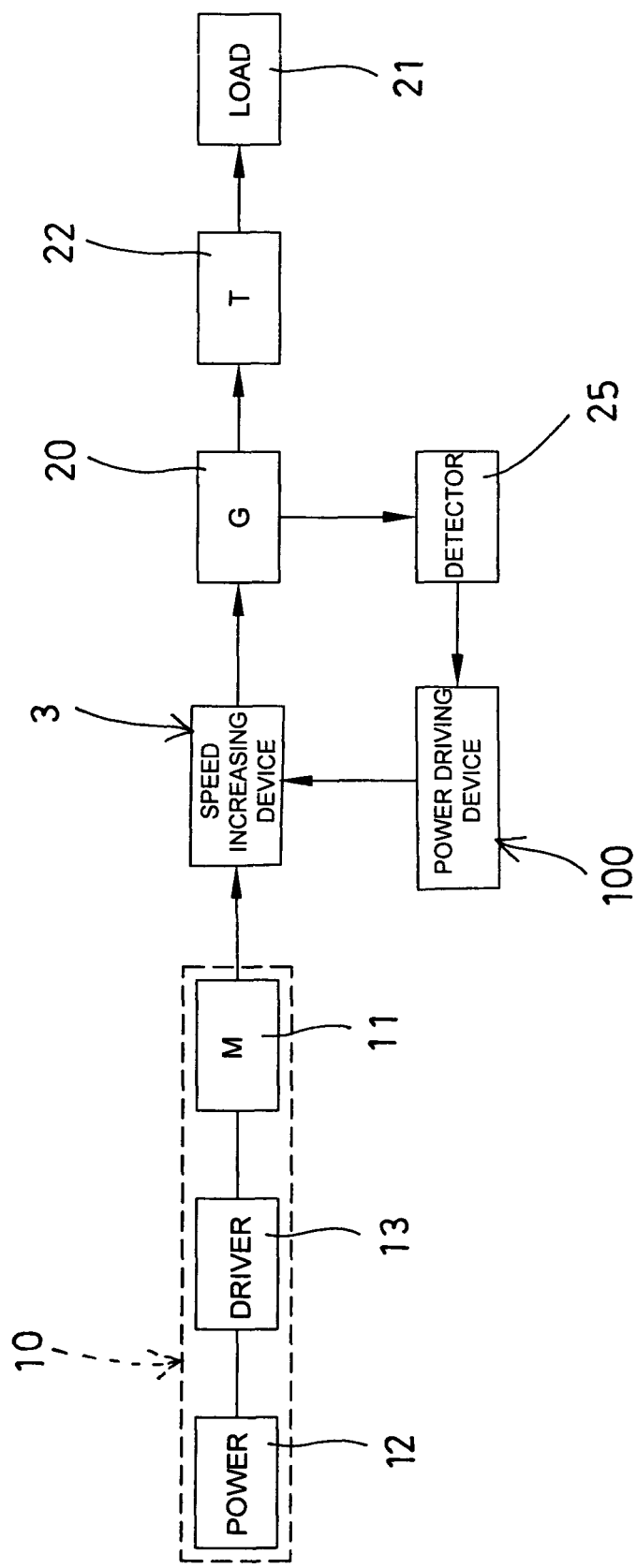
FIG. 1 is a block diagram illustrating the parts or elements of an electric generating device in accordance with the present invention.
Figure 2:
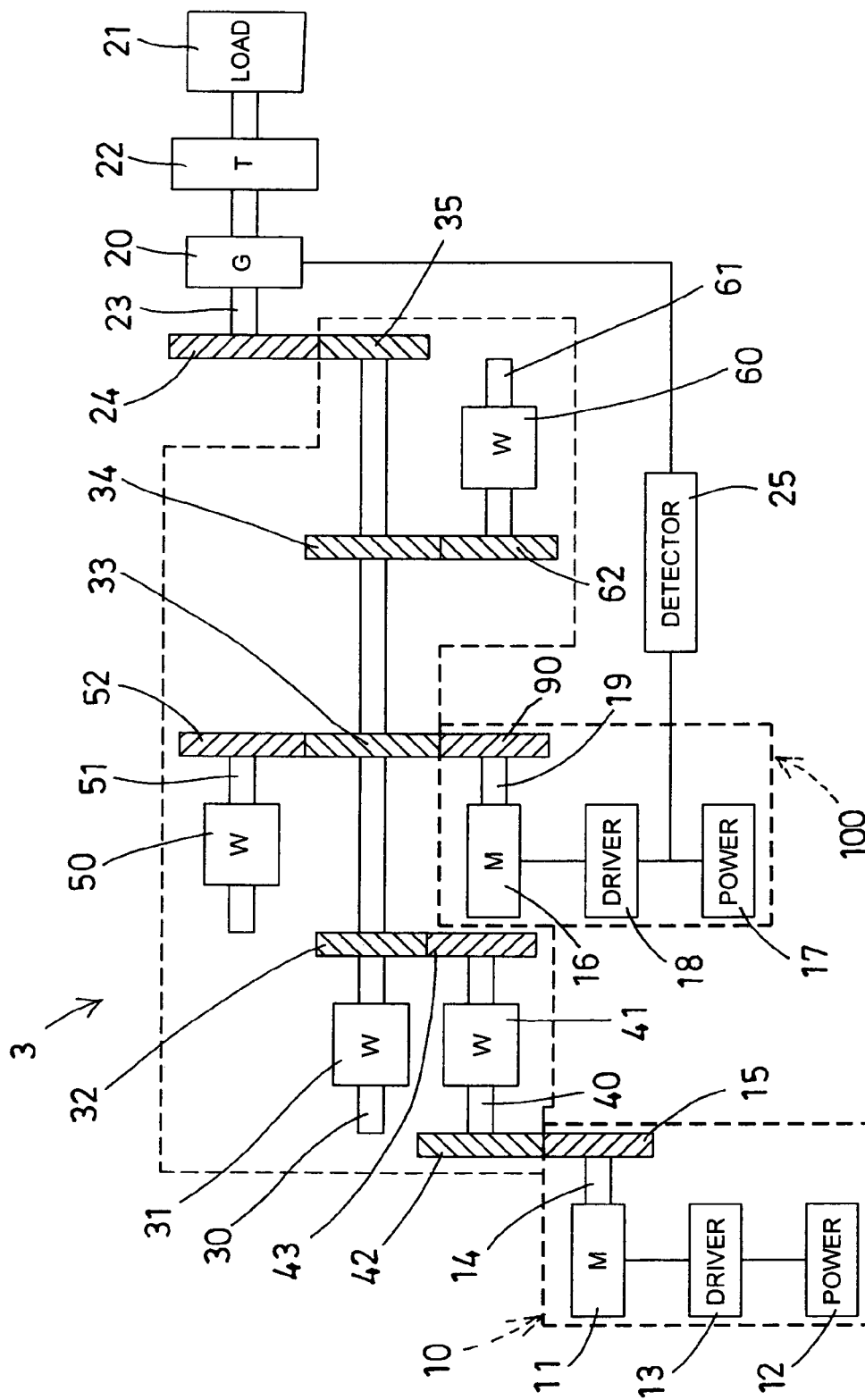
FIG. 2 is another block diagram illustrating the parts or elements of a speed increasing device of the electric generating device.

Referring to the drawings, and initially to FIGS. 1 and 2, an electric generating device in accordance with the present invention comprises a power driving device 10 including a motor 11 directly or indirectly connected or coupled to an electric reservoir or power source 12 with a driving or actuating mechanism or driver 13, and an electric generator or generating mechanism 20 to be connected or coupled to the motor 11 of the power driving device 10 and to be actuated or operated to generate the electricity or the electric energy or power, and a flywheel speed increasing device 3 is further be provided and connected or coupled between the power driving device 10 and the electric generating mechanism 20 for suitably increasing the driving speed of the electric generating mechanism 20 and for suitably increasing the electricity generating effect or efficiency thereof.

The motor 11 of the power driving device 10 includes a spindle 14, and a bevel gear 15 attached or mounted or secured to the spindle 14 and rotated in concert with the spindle 14 for engaging with or connecting or coupling to the speed increasing device 3, and the electric generating mechanism 20 includes a pivot axle 23, and another bevel gear 24 attached or mounted or secured to the pivot axle 23 and rotated in concert with the pivot axle 23 for engaging with or connecting or coupling to the speed increasing device 3, the electric generating mechanism 20 may be directly or indirectly connected or coupled to a load 21 with an electric transforming mechanism or transformer "T" 22 for energizing or driving or actuating or operating the load 21 which may be selected from any electric apparatuses or facilities.

The speed increasing device 3 includes a first or primary shaft 30 and a secondary or auxiliary shaft 40 disposed or arranged parallel to each other, and includes an idle wheel or flywheel "W" 31, 41 disposed or attached or mounted or secured onto the shafts 30, 40 and rotated in concert with the shafts 30, 40 respectively for suitably increasing the momentum of the shafts 30, 40, and includes one or more (such as four) further bevel gears 32, 33, 34, 35 disposed or attached or mounted or secured onto the primary shaft 30 and rotated in concert with the primary shaft 30, and includes two further bevel gears 42, 43 disposed or attached or mounted or secured onto the auxiliary shaft 40 and rotated in concert with the auxiliary shaft 40, in which the bevel gear 42 is meshed or engaged with the bevel gear 15 of the motor 11, and the other bevel gear 43 is meshed or engaged with the bevel gear 32 of the primary shaft 30 or of the flywheel 31 for allowing the shafts 30, 40 to be pivoted or rotated or driven by the motor 11.

The speed increasing device 3 may further include one or more (such as two) idle wheels or flywheels "W" 50, 60 attached or mounted or secured onto a pivot rod 51, 61 respectively and each having a bevel gear 52, 62 disposed or attached or mounted or secured onto the pivot rod 51, 61 and rotated in concert with the pivot rod 51, 61, in which the bevel gear 52 of the flywheel 50 or of the pivot rod 51 is meshed or engaged with the bevel gear 33 of the primary shaft 30 or of the flywheel 31, and the other bevel gear 62 is meshed or engaged with the bevel gear 34 of the primary shaft 30 or of the flywheel 31 for allowing the pivot rods 51, 61 and the flywheels 50, 60 also to be pivoted or rotated or driven by the motor 11. The flywheels 31, 41, 50, 60 may be used to suitably increase the momentum or the speed of the shafts 30, 40.

As shown in FIGS. 1 and 2, the speed increasing device 3 may further include one or more further power driving devices 100 provided and coupled to the primary shaft 30 for further driving or rotating the primary shaft 30. For example, the further power driving device 100 also includes a motor 16 directly or indirectly connected or coupled to an electric reservoir or power source 17 with a driving or actuating mechanism or driver 18, and the motor 16 of the further power driving device 100 also includes a spindle 19, and a bevel gear 90 attached or mounted or secured to the spindle 19 and rotated in concert with the spindle 19 for engaging with the bevel gear 33 of the primary shaft 30 or of the flywheel 31 and for further driving or rotating the primary shaft 30. A detector, such as a voltage detector 25 may further be provided and connected or coupled between the electric generating mechanism 20 and the driver 18 or the motor 16 for selectively actuating or operating the motor 16 to further drive or rotate the primary shaft 30.

For example, when the detector 25 has detected that the electricity or the electric energy or power or voltage generated by the electric generating mechanism 20 is lowered than a predetermined level, or when the electricity or the electric energy or power or voltage generated by the electric generating mechanism 20 has mostly been supplied to energize or drive or actuate or operate the load 21 or the electric apparatuses or facilities, the motor 16 may be selectively actuated or operated to further drive or rotate the primary shaft 30 and to increase the driving speed of the shaft 30 and the electric generating mechanism 20. The motor 16 may be selectively switched off or turned off when the detector 25 has detected that the electricity or the electric energy or power or voltage generated by the electric generating mechanism 20 is great enough or greater than the predetermined level.

The sizes or dimensions of diameters of the bevel gears 15, 24, 32-35, 42-43, 52, 62 may be selectively changed to suitably increase or maintain or determine the driving speed of the electric generating mechanism 20. It is preferable, but not necessarily that the diameter of the bevel gear 24 may be greater than that of the bevel gear 34, the diameter of the bevel gear 34 may be greater than that of the bevel gear 33, and the diameter of the bevel gear 33 may be greater than that of the bevel gear 52, and the diameter of the bevel gear 55 may be greater than that of the bevel gear 42 such that the diameter of the bevel gear 24 is greater than that of the bevel gear 42, the diameter of the bevel gear 42 is greater than that of the bevel gear 62 and the diameter of the bevel gear 62 may be greater than that of the bevel gear 35 such that the diameter of the bevel gear 42 is greater than that of the bevel gear 35.

Figure 3:
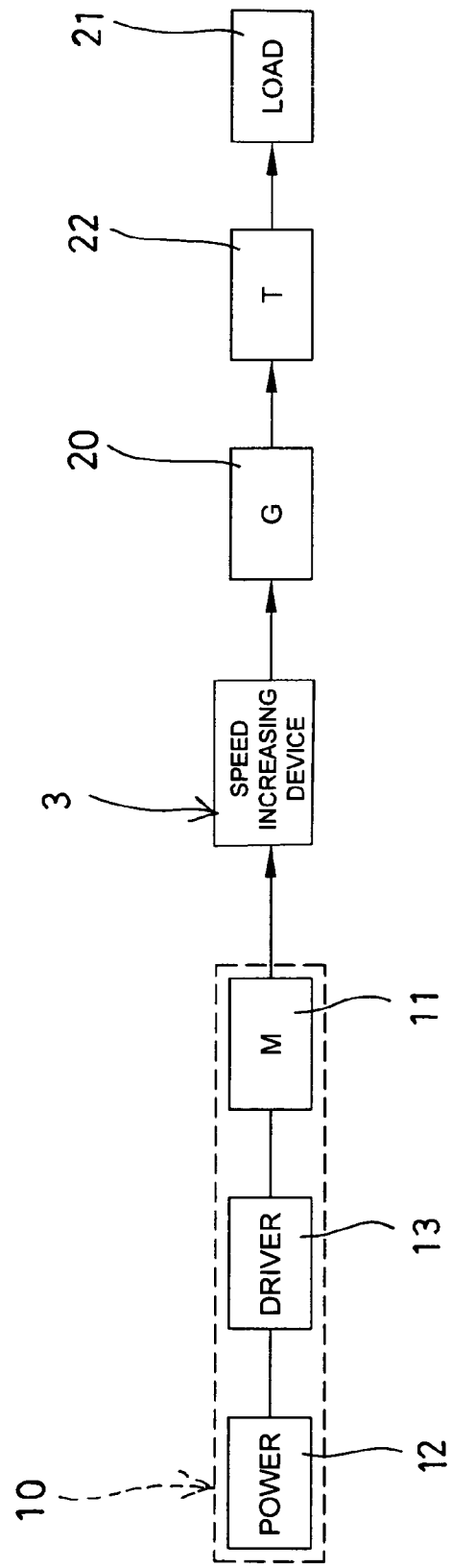
FIG. 3 is a further block diagram similar to FIG. 1, illustrating the other arrangement of the electric generating device.
Figure 4:
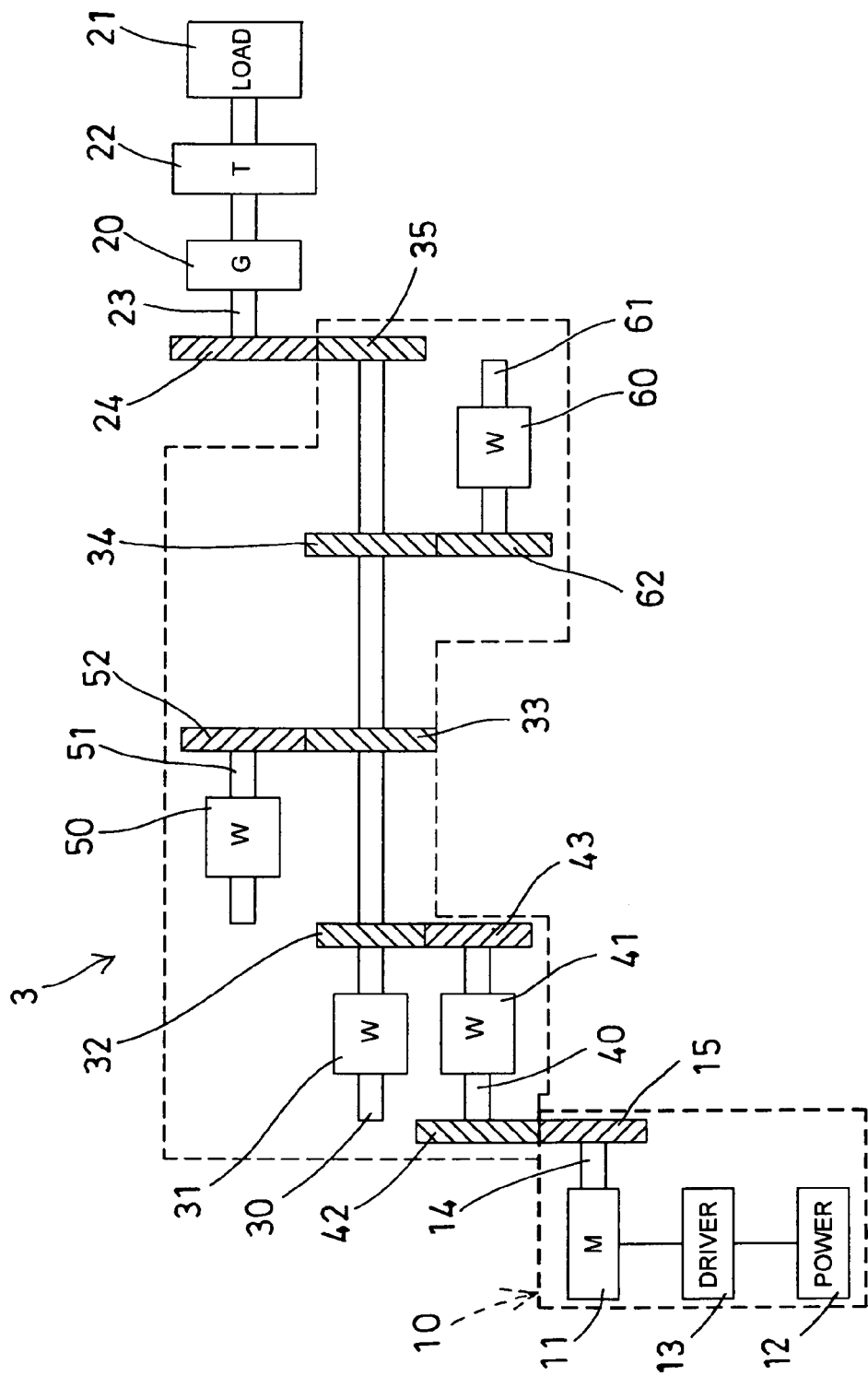
FIG. 4 is a still further block diagram similar to FIG. 2, illustrating the parts or elements of the speed increasing device of the electric generating device.
Figure 5:
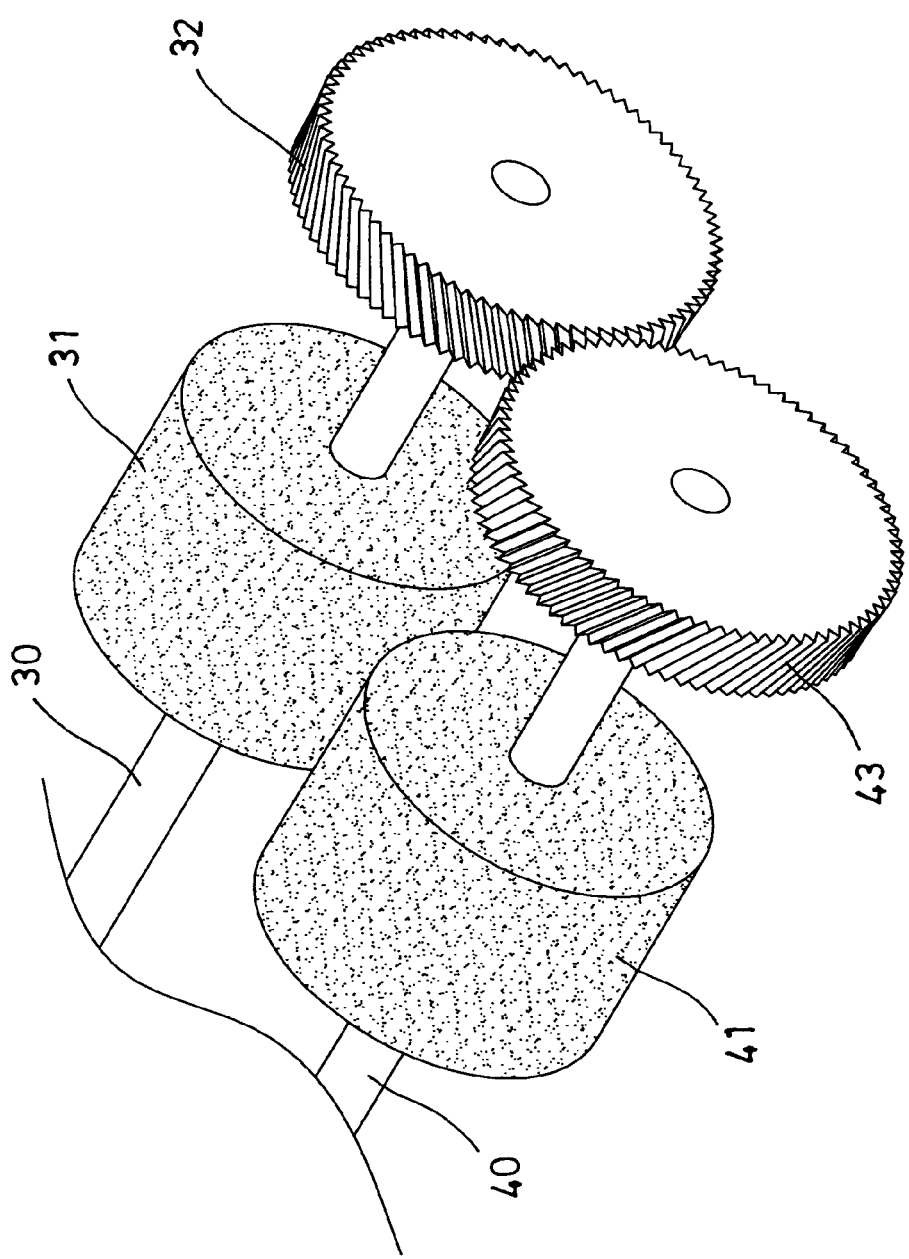
FIG. 5 is a partial perspective view of the speed increasing device of the electric generating device.

In addition, the diameter of the bevel gear 35 may be equal to that of the bevel gear 32, and may be equal to that of the bevel gear 43, and may be equal to that of the bevel gear 15. However, again, the sizes or dimensions of diameters of the bevel gears 15, 24, 32-35, 42-43, 52, 62 may be selectively changed or altered or selected to suitably increase or maintain or determine the driving speed of the electric generating mechanism 20 at the required level or the like. The speed increasing device 3 may include a simplified structure as shown in FIGS. 3 and 4. As shown in FIG. 5, the engaging area between the bevel gears 15, 24, 32-35, 42-43, 52, 62 may be relatively increased than the typical flat gears or pinions for suitably decreasing the noise that may be generated by the electric generating devices.

Accordingly, the electric generating device in accordance with the present invention includes a speed increasing device for suitably increasing the driving speed of the electric generating device and for suitably increasing the electricity generating effect or efficiency thereof, and including a mechanism for suitably decreasing the noise that may be generated by the electric generating device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An electric generating device comprising:
a power driving device including a motor having a spindle, and a first bevel gear attached to said spindle and rotated in concert with said spindle,
an electric generating mechanism including a pivot axle, and a second bevel gear attached to said pivot axle and rotated in concert with said pivot axle, and a speed increasing device including a first shaft and a second shaft, a first flywheel attached to said first shaft and rotated in concert with said first shaft for increasing a momentum of said first shaft, a second flywheel attached to said second shaft and rotated in concert with said second shaft for increasing a momentum of said second shaft, a third bevel gear attached to said second shaft and rotated in concert with said second shaft and engaged with said first bevel gear of said motor, a fourth bevel gear attached to said second shaft and rotated in concert with said second shaft, a fifth bevel gear attached to said first shaft and rotated in concert with said first shaft and engaged with said fourth bevel gear of said second shaft, and a sixth bevel gear attached to said first shaft and rotated in concert with said first shaft and engaged with said second bevel gear of said electric generating mechanism, and said first shaft including a seventh bevel gear attached to said first shaft and rotated in concert with said first shaft, and said speed increasing device including a pivot rod, and an eighth bevel gear attached to said pivot rod and rotated in concert with said pivot rod and engaged with said seventh bevel gear of said first shaft.

2. The electric generating device as claimed in claim 1, wherein said first shaft includes a third flywheel attached to said pivot rod and rotated in concert with said pivot rod.

3. The electric generating device as claimed in claim 1 further comprising a second power driving device including a second motor having a spindle, and a ninth bevel gear attached to said spindle and rotated in concert with said spindle and engaged with said seventh bevel gear of said first shaft.

4. The electric generating device as claimed in claim 3, wherein said second motor is coupled to a driver and an electric power source.

5. The electric generating device as claimed in claim 3 further comprising a voltage detector connected between said electric generating mechanism and said second power driving device.

6. The electric generating device as claimed in claim 1, wherein said electric generating mechanism is coupled to a transformer and a load.

7. The electric generating device as claimed in claim 1, wherein said motor is coupled to a driver and an electric power source.

* * * * *